(12) United States Patent
Rebernik

(10) Patent No.: US 11,655,941 B2
(45) Date of Patent: May 23, 2023

(54) SUSPENSION SYSTEM FOR AN INNER CONTAINER MOUNTED FOR THERMAL INSULATION IN AN OUTER CONTAINER AND CONTAINER ARRANGEMENT

(71) Applicant: CRYOSHELTER GMBH, Graz (AT)

(72) Inventor: Matthias Rebernik, Graz (AT)

(73) Assignee: CRYOSHELTER GMBH, Graz (AT)

( * ) Notice: Subject to any disclaimer, the term of this patent is extended or adjusted under 35 U.S.C. 154(b) by 665 days.

(21) Appl. No.: 16/279,456

(22) Filed: Feb. 19, 2019

(65) Prior Publication Data
US 2019/0178444 A1 Jun. 13, 2019

Related U.S. Application Data

(62) Division of application No. 14/781,234, filed as application No. PCT/EP2014/056618 on Apr. 2, 2014, now Pat. No. 10,295,120.

(30) Foreign Application Priority Data

Apr. 5, 2013 (EP) ..................................... 13162456

(51) Int. Cl.
*F17C 3/08* (2006.01)
*F17C 3/02* (2006.01)

(52) U.S. Cl.
CPC ................. *F17C 3/08* (2013.01); *F17C 3/02* (2013.01); *F17C 2201/0109* (2013.01);
(Continued)

(58) Field of Classification Search
CPC .... F17C 3/08; F17C 3/02; F17C 3/087; F17C 2201/0109; F17C 2201/0157;
(Continued)

(56) References Cited

U.S. PATENT DOCUMENTS 2,926,810 A 3/1960 Yeager
3,115,983 A 12/1963 Wissmiller
(Continued)

FOREIGN PATENT DOCUMENTS

DE 281318 A7 8/1990
DE 281319 A7 8/1990
(Continued)

OTHER PUBLICATIONS

International Preliminary Report on Patentability cited in PCT Application No. PCT/EP2014/056618 dated Oct. 15, 2015.

*Primary Examiner* — Andrew D Perreault
(74) *Attorney, Agent, or Firm* — Workman Nydegger

(57) ABSTRACT

Suspension system for an inner container mounted for thermal insulation in an outer container. Rod-shaped fixed bearing securing elements of a fixed bearing system engage the outer container and the inner container and can be stressed in tension and compression. Fixed bearing securing elements engage the inner container while being arranged so as to be distributed in an annular installation space between the inner container and outer container, and they engage the outer container while being distributed in the annular installation space. A floating bearing system with a floating bearing ring and annularly distributed floating bearing securing elements can be arranged in the outer container to support the inner container. The floating bearing securing elements can be stressed in tension by tension springs and/or in compression by compression springs and engage the floating bearing ring and the inner container or the outer container.

9 Claims, 7 Drawing Sheets

(52) U.S. Cl.
CPC ............... *F17C 2201/0157* (2013.01); *F17C 2201/056* (2013.01); *F17C 2203/015* (2013.01); *F17C 2203/03* (2013.01); *F17C 2203/0308* (2013.01); *F17C 2203/0391* (2013.01); *F17C 2203/0629* (2013.01); *F17C 2221/033* (2013.01); *F17C 2223/0161* (2013.01); *F17C 2223/033* (2013.01); *F17C 2260/011* (2013.01); *F17C 2270/0168* (2013.01)

(58) Field of Classification Search
CPC .......... F17C 2201/056; F17C 2203/015; F17C 2203/03; F17C 2203/0308; F17C 2203/0391; F17C 2203/0629; F17C 2221/033; F17C 2223/0161; F17C 2223/033; F17C 2260/011; F17C 2270/0168

USPC ............................................ 220/592.2, 560.1
See application file for complete search history.

(56) References Cited

U.S. PATENT DOCUMENTS

| | | |
|---|---|---|
| 7,757,882 B2 | 7/2010 | Immel |
| 8,028,853 B2 | 10/2011 | Hobbs |
| 2005/0077300 A1 | 4/2005 | Hafellner |

FOREIGN PATENT DOCUMENTS

| | | |
|---|---|---|
| DE | 19625492 C1 | 1/1998 |
| DE | 10345958 A1 | 4/2005 |
| EP | 0014250 A1 | 8/1980 |
| WO | 2014161899 | 10/2014 |

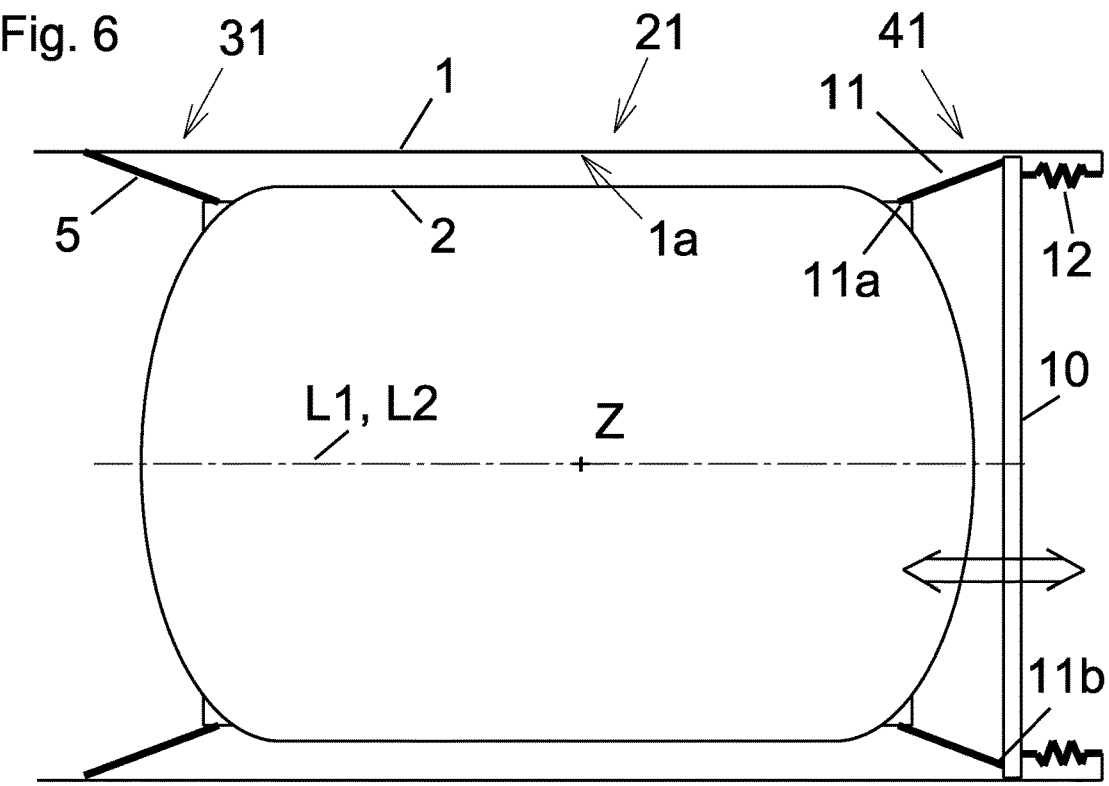
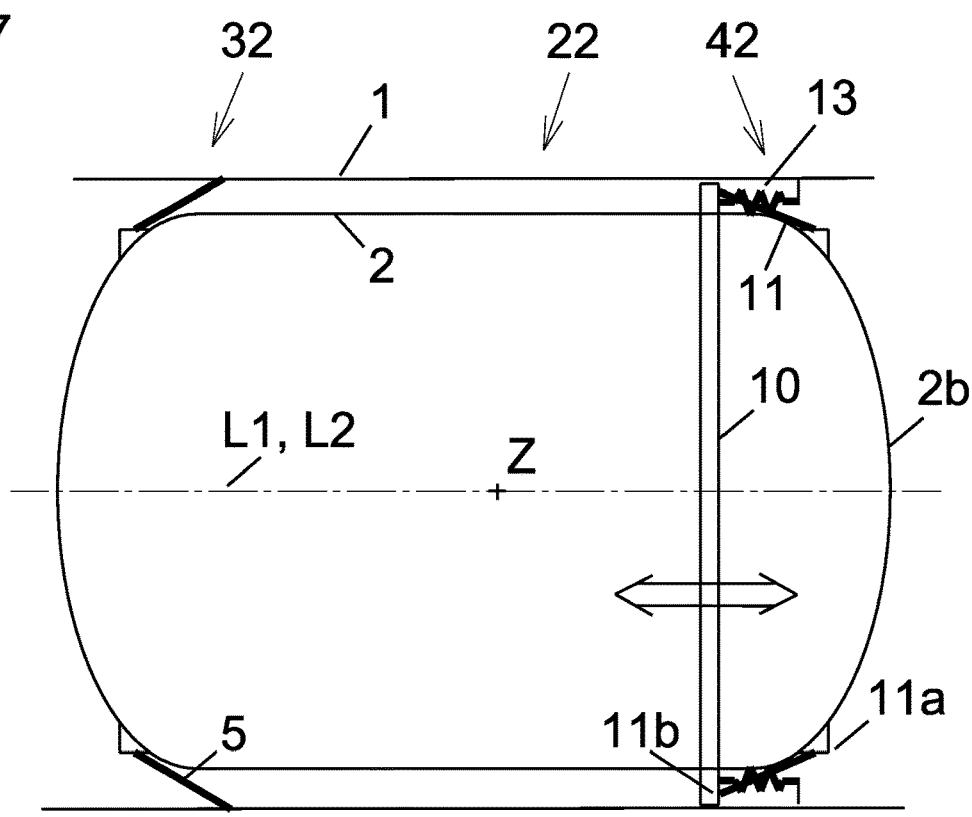

SUSPENSION SYSTEM FOR AN INNER CONTAINER MOUNTED FOR THERMAL INSULATION IN AN OUTER CONTAINER AND CONTAINER ARRANGEMENT

CROSS-REFERENCE TO RELATED APPLICATIONS

This Application is a division of U.S. application Ser. No. 14/781,234, filed Sep. 29, 2015, which is a 371 Application of International Application No. PCT/EP2014/056618, filed Apr. 2, 2014, which claims the benefit of European Application No. 13162456.1, filed Apr. 5, 2013, the disclosures of which are incorporate herein by reference in their entirety.

BACKGROUND

The invention relates to a suspension system for an inner container mounted for thermal insulation in an outer container.

Furthermore, the invention relates to an arrangement of an outer container and of an inner container mounted for thermal insulation in the outer container.

From Document EP 0 014 250 A1, a suspension system for a cryogenic tank is known, by means of which the cryogenic tank is suspended in an outer container in a thermally insulated manner. The suspension system comprises several securing straps, each composed of several series-connected single elements of different fibre materials, wherein the single element of each securing strap which is closest to the tank is made up of the fibre material having the comparatively lowest thermal expansion coefficient. The securing straps are able to absorb only tensile forces, but no compression forces. Therefore, it is necessary to group the securing straps to two fixed bearings engaging opposite end regions of the cryogenic tank, with the tensile forces of the two fixed bearings acting in opposite directions. A fixed bearing results only from the sum of all securing elements. A prerequisite for this is a geometric arrangement of the securing elements which compensates for the thermal length changes of the respective containers and of the securing straps themselves as far as possible, since, otherwise, the thermal tensions would burden the device up to the admissible load limit.

From DE 196 25 492 C1, a toroidal cryotank filled with liquid helium is known, which, via a suspension system, is suspended coaxially in a cylindrical outer container aboard a research satellite. The suspension system consists of an upper and a lower rectangular frame, each composed of tension and pressure bars in the manner of a framework, and tie rods running under prestress obliquely between the respective corner points of the rectangular frames and the outer container. Thus, the cryotank is connected to the outer container only via the tie rods. The tie rods are able to absorb only tensile forces, but no compression forces.

From Document U.S. Pat. No. 3,115,983, a suspension system for a multi-walled cryogenic spherical liquid storage tank is known. The outer container rests on pillars extending vertically upwards from a base. The outer container is connected to the inner container by means of a plurality of loop-shaped tension members 15. The tension members are distributed around the inner diameter of the outer container and extend in the space between the outer container and the inner container. On the one hand, the tension members are fixed with their two ends to support base members 14 located in pairs on the inside of the outer container and, on the other hand, enlace curved lateral edges of pad plates 17 attached to the outer wall of the inner container. Because of the enlacement, the pad plates are supported in the tension members as a result of gravity. In order to prevent the tension members from gliding off the curved lateral edges of the pad plates 17, retaining lugs 18 are provided, which, however, do not clamp the tension members. Since only gravity acts upon the inner container, the tension members are only stressed in tension and may therefore be constructed as ropes, cables or chains. It is also mentioned that the tension members may be designed as appropriately shaped rigid rods, but also in such an embodiment, the tension members will not absorb any compression forces, since, with a force acting upwards onto the inner container, the pad plates would lift off from the tension members. With forces acting laterally upon the inner container, the rod-shaped tension members would slip out of place along the semi-circular edges of the pad plates. As is mentioned in the document, such movements are desirable for the compensation of thermal tensions. From a mechanical point of view, the mounting of the inner container on the outer container thus constitutes a floating bearing.

As is generally known, in mechanics, a distinction is made between floating bearings and fixed bearings. A fixed bearing transmits forces acting in space in all directions. With a floating bearing, no connection exists in one or two of the three directions in space, and a force transmission in said direction is thus impossible. Thus, a floating bearing permits a movement of the mounted body in at least one spatial direction.

Document DE 103 45 958 A1 discloses a tank for cryogenic liquids which is intended for installation in motor vehicles and consists of an outer container and an inner container suspended therein in tension or compression struts. The spatially arranged tension or compression struts compensate for displacements of the inner container as a result of differences in thermal expansion. In order to optimally meet the opposing requirements in motor vehicles, stoppers and supporting surfaces are additionally provided between the outer container and the inner container, which can be brought to a distance in a stationary vehicle and into contact in a moving vehicle. The stoppers in the interior of the outer container co-operate with supporting surfaces at the inner container and are displaceable by means of an actuator. In a stationary vehicle, the stoppers do not abut on the supporting surfaces. The inner container is then connected to the outer container only by means of the tension or compression struts, which is regarded as sufficient, since shaking normally does not occur if the motor vehicle is at a standstill. Thus, the tension or compression struts can be designed so as to be very light-weight and with a very small cross-section so that they will form only minimal thermal bridges. For the vehicle operation, the stopper is switched into contact with the supporting surface. The inner container is now free from play and firmly connected to the outer container, the inner container is thus fixed in the outer container, and the tension or compression struts are unloaded. Hence, a fixed bearing of the inner container at the outer container is formed only if the stopper is switched into contact with the supporting surface. The struts absorb either tensile forces or compression forces and, as a result of their small cross-sections, are unsuitable for supporting the inner tank during vehicle operation.

Document DE 281 319 A7 discloses a bearing for double-walled containers of cryogenic media and is usable equally for stationary tanks and for transport containers for road and rail transport. The bearing is composed of at least three rings or ring segments, the ends of which are interconnected in the shape of a meander. Depending on whether an asymmetric or a symmetric structure of the meander has been chosen, a ring or, respectively, the outer rings thereof is/are attached to the outer container and a ring or, respectively, the central ring thereof is loosely connected to the inner container. Said bearing permits the transmission of large radial forces, but does not absorb any noteworthy axial forces. Hence, this is a floating bearing with axial freedom of motion for compensating for thermal length changes of the inner container. Two floating bearings of this type keep the inner container therewith in a radial direction. For axial safeguarding, one of the two floating bearings must be axially supported by an additional measure, for which the inclusion of a cone is recommended. A fixed bearing results only from the combination of the radial mounting with the axial support.

Document DE 281 318 A7 discloses a bearing for double-walled containers of cryogenic media and is usable equally for stationary tanks and for transport containers for road and rail transport. The bearing is configured as a meander-shaped hollow profile supporting, in its longitudinal axis, a central flange which is connected to the inner container, whereas, by contrast, the outer end of the hollow profile is fastened to the outer container. A single bearing element—consisting of a meander-shaped hollow profile with a central flange—constitutes a floating bearing. Since it is not fixedly connected to the inner container in order to avoid thermal tensions, it constitutes, strictly speaking, a floating bearing which can be stressed only in compression. A fixed bearing in a technical sense is achieved only by several bearings offset from each other in different spatial directions. The bearings are arranged in an annular installation space between the inner container and the outer container, which is referred to as an annular gap.

There is still a need for a highly stable and rigid suspension system for an inner container mounted for thermal insulation in an outer container. Even if high dynamic forces act upon the outer container and the inner container as well as the suspension system, as they occur, for example, with the application in vehicles or in case of shocks, the stability and the rigidity of the suspension system must be maintained and forces must be introduced into the containers in a distributed fashion, without high local force peaks. It is in particular an object of the invention to develop a suspension system by means of which a mounting of an inner container in an outer container in a thermally insulated manner is feasible, which is highly rigid and very capable of bearing, without or with comparatively minor specific stiffening measures at the containers. It is also an object of the invention to provide a suspension system and a container arrangement provided therewith which are inexpensive to produce and easy to assemble.

SUMMARY

The present invention solves this problem by providing a suspension system for an inner container mounted for thermal insulation in an outer container in that a single fixed bearing is provided which comprises rod-shaped fixed bearing securing elements which engage, on the one hand, the outer container and, on the other hand, the inner container and which can be stressed in tension and in compression, the fixed bearing securing elements engaging the inner container while being arranged so as to be distributed in an annular installation space defined between the inner container and the outer container, preferably distributed in the area of the circumference of the inner container, and the fixed bearing securing elements engaging the outer container while being distributed in the annular installation space, preferably in the area of the circumference of the outer container. The thermal insulation between the inner container and the outer container is preferably effected by evacuating the space between. Through the suspension system according to the invention, forces are introduced into areas where the containers are of high rigidity. The contact points of the fixed bearing securing elements at the inner container are located radially closer to the circumference of the inner container than to the longitudinal axis of the inner container. The contact points of the fixed bearing securing elements at the outer container are located radially closer to the circumference of the outer container than to the longitudinal axis of the outer container. Preferably, the contact points of the fixed bearing securing elements at the outer container are located at the peripheral wall of the outer container.

According to the invention, the function of a fixed bearing is achieved by mounting the rod-shaped fixed bearing securing elements in the annular installation space with main direction axes offset from each other in different spatial directions. The fixed bearing securing elements are connected firmly, i.e., so that they can be stressed in tension and in compression, both at the inner container and at the outer container and, respectively, at the floating bearing ring. The fixed bearing function results from the combined effect of the force transmission of the individual fixed bearing securing elements. Also with the floating bearings as described below, the floating bearing securing elements are connected firmly, i.e., so that they can be stressed in tension and in compression, both at the inner container or the outer container and at the floating bearing ring.

By the term "radial", a person skilled in the art understands "running in the direction of a radius" or, respectively, in case of geometric shapes which have no radius, "originating radially from a centre or aiming at it". In a cross-sectional view of a geometric body having an axis, the axis depicted as a dot in the cross-sectional view and emerging normally from the plane of projection may be regarded as the centre. In this document, the term "radial" is understood in the sense of "on a normal plane relative to the longitudinal axis along the main dimension of the containers" and, for illustrative purposes, is depicted like that also in several of the attached drawings.

By the term "axial", a person skilled in the art understands "in the axis" or, respectively, "along the axis". The term "longitudinal axis" is understood to mean an axis along the main dimension (=largest extension) of a body.

The fixed bearing securing elements are rigid rod-shaped elements. Preferably, the fixed bearing securing elements essentially consist of fibre-reinforced materials, preferably comprising aramide fibres, carbon fibres, glass fibres, basalt fibres or combinations thereof, particularly preferably comprising aramide fibres which, in sections, are mixed with glass fibres, since those materials exhibit the required stiffness.

The term "a single fixed bearing" is understood to mean that the fixed bearing engages with its securing elements only a portion of the inner container, said portion running transversely to a longitudinal axis of the inner container annularly around a peripheral wall of the inner container or at a front wall of the inner container at a distance from the longitudinal axis thereof. No further fixed bearing is provided, but either the inner container is supported in a freely cantilevered manner only by this one fixed bearing, or a floating bearing is additionally provided which engages the inner container at a distance from the fixed bearing.

The invention also comprises an arrangement of an outer container and an inner container mounted for thermal insulation in the outer container, with the inner container being connected to the outer container by the suspension system according to the invention. So as to keep the size of the container arrangement as small as possible, the outer container and the inner container are preferably arranged with coaxial longitudinal container axes.

The fixed bearing securing elements are arranged in an annular installation space defined between the inner container and the outer container and preferably extending around the circumference of the inner container, which, however, may also partly run along a section of a front-end wall which is spaced apart from the longitudinal axis of the inner container. In geometric terms, the annular installation space can also be regarded as a hollow profile.

In the suspension system according to the invention, the fixed bearing securing elements are oblique to the longitudinal axis of the inner container. In particular, the fixed bearing securing elements are neither parallel nor normal to the longitudinal axis of the inner container. As a result, the forces introduced by the securing elements into the walls of the inner container and the outer container are distributed very evenly independently of the direction of application of dynamic forces, and the deflection of the inner container is kept small. Those effects are achieved particularly well if the fixed bearing securing elements are mirrored, always in pairs, at a plane including the longitudinal axis of the inner container. In an embodiment of the suspension system according to the invention which provides a particularly high torsion resistance, the fixed bearing securing elements do not intersect the longitudinal axis of the inner container, or, in other words, the fixed bearing securing elements are arranged so as to be skew relative to the longitudinal axis of the inner container.

An optimization of the even distribution of the forces introduced by the securing elements into the walls of the inner container and the outer container is achieved if the contact points of the fixed bearing securing elements at the inner container are located on a normal plane relative to the longitudinal axis of the inner container and/or if the contact points of the fixed bearing securing elements at the outer container are located on a normal plane relative to the longitudinal axis of the outer container.

For a particularly short container arrangement, it is suitable if the contact points of the fixed bearing securing elements at the inner container are axially further away from the centre of the inner container than the contact points of the securing elements at the outer container.

The smallest radial insulation gap of the suspension system is achieved if the contact points of the fixed bearing securing elements at the inner container are axially closer to the centre of the inner container than the contact points of the fixed bearing securing elements at the outer container.

A preferred embodiment of the suspension system according to the invention comprises a floating bearing arranged in the outer container and supporting the inner container and designed with a floating bearing ring, with annularly distributed rod-shaped floating bearing securing elements, which can be stressed in tension and in compression, engaging, on the one hand, the floating bearing ring and, on the other hand, the inner container or the outer container, wherein the floating bearing securing elements are arranged in an annular installation space preferably extending around the circumference of the inner container, the floating bearing ring preferably being prestressed by means of tension springs or compression springs. If the floating bearing securing elements engage the floating bearing ring and the inner container, the floating bearing ring is arranged displaceably in the outer container. If the floating bearing securing elements engage the floating bearing ring and the outer container, the inner container is arranged displaceably in the floating bearing ring.

Preferably, the floating bearing securing elements are oblique to the longitudinal axis of the inner container. In particular, the floating bearing securing elements are neither parallel nor normal to the longitudinal axis of the inner container. In said embodiment, the forces introduced by the securing elements into the walls of the inner container and, respectively, the outer container are distributed properly independently of the direction of application of dynamic forces. A particularly even distribution of dynamic forces is achieved if the floating bearing securing elements are mirrored, always in pairs, at a plane including the longitudinal axis of the inner container. In an embodiment of the suspension system according to the invention which provides a particularly high torsion resistance, the floating bearing securing elements do not intersect the longitudinal axis of the inner container, or, in other words, the floating bearing securing elements are arranged so as to be skew relative to the longitudinal axis of the inner container.

For a particularly short container arrangement, it is suitable if the contact points of the floating bearing securing elements at the inner container are axially further away from the centre of the inner container than the contact points of the floating bearing securing elements at the floating bearing ring. In an alternative embodiment, the contact points of the floating bearing securing elements at the outer container are axially further away from the centre of the inner container than the contact points of the floating bearing securing elements at the floating bearing ring.

A small insulation gap is achieved if the contact points of the floating bearing securing elements at the inner container are closer to the centre of the inner container than the contact points of the securing elements at the floating bearing ring. In an alternative embodiment, the contact points of the floating bearing securing elements at the outer container are closer to the centre of the inner container than the contact points of the securing elements at the floating bearing ring.

The floating bearing securing elements should consists of a material as rigid as possible. Fibre-reinforced materials, preferably comprising aramide fibres, carbon fibres, glass fibres, basalt fibres or combinations thereof, particularly preferably comprising aramide fibres which, in sections, are mixed with glass fibres, are preferred.

For an optimum thermal insulation, at least one radiation shield is arranged between the outer container and the inner container. For a thermal conduction as low as possible to exist between the radiation shield and the inner container, it is envisaged that at least one radiation shield is mounted directly to securing elements of the suspension system. Further radiation shields can also be mounted to at least one of said radiation shields.

BRIEF DESCRIPTION OF THE DRAWINGS

The invention is now illustrated further on the basis of exemplary embodiments with reference to the drawings.

FIG. 6 shows a schematic longitudinal view of a further embodiment of a container arrangement according to the invention.

FIG. 7 shows a schematic longitudinal view of an alternative embodiment of a container arrangement according to the invention.

DETAILED DESCRIPTION

Figure 1:
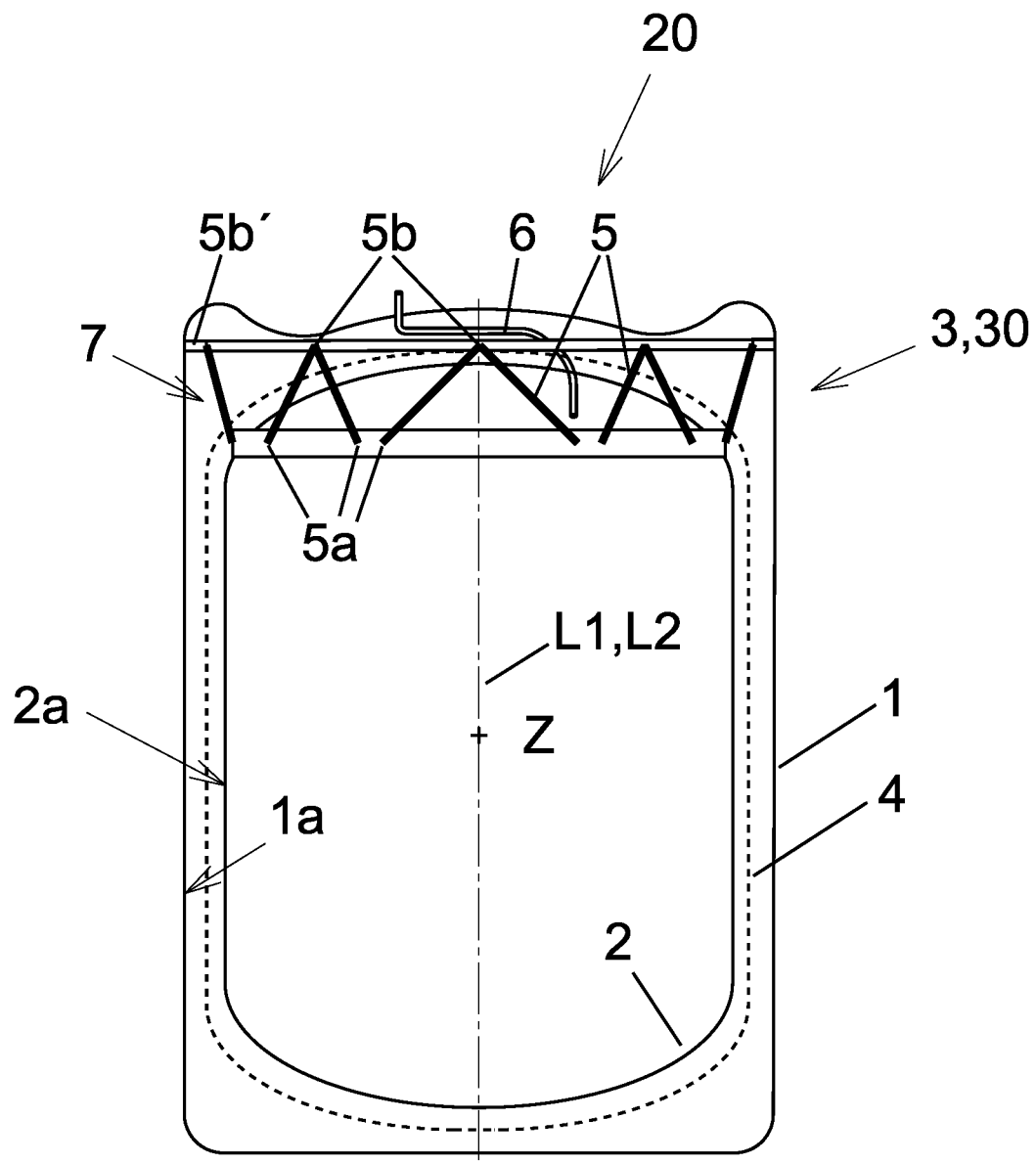
FIG. 1 shows a schematic longitudinal view of a container arrangement according to the invention.

FIG. 1 shows a container arrangement 20 comprising an outer container 1 and an inner container 2 mounted for thermal insulation in the outer container 1 for accommodating cryogenic media and/or devices, which are interconnected by a suspension system generally indicated by 3. The thermal insulation of the inner container 2 against the outer container 1 is effected by evacuating the space between the two containers. The outer container 1 exhibits a central longitudinal axis L1; the inner container 2 exhibits a central longitudinal axis L2 on which the centre point Z of the inner container 2 is located. The two longitudinal axes L1, L2 are arranged coaxially. The filling of the inner container occurs through at least one line 6. Between the outer container 1 and the inner container 2, a radiation shield 4 is arranged which is mounted directly to fixed bearing securing elements 5. Optionally, further radiation shields may be provided which surround each other, wherein the further radiation shields can be mounted either to an adjacent radiation shield or also to the fixed bearing securing elements 5.

The suspension system 3 of the container arrangement 20 consists of a single fixed bearing 30 comprising rod-shaped fixed bearing securing elements 5 which engage, on the one hand, the outer container 1 and, on the other hand, the inner container 2 and which can be stressed in tension and in compression, with the fixed bearing securing elements 5 engaging the outer wall 2a of the inner container 2 directly or indirectly (e.g., via a tethering ring), while being annularly distributed at the circumferential region of the inner container 2. Also in the further embodiments described below and depicted in the drawings, the fixed bearing securing elements 5 are designed in the form of rods. The contact points 5a of the fixed bearing securing elements 5 at the outer wall 2a are located in an annularly distributed manner on a plane orthogonal to the longitudinal axis L2 of the inner container 2. The fixed bearing securing elements 5 engage with further contact points 5b the circumferential region of the inner wall 1a of the outer container 1 either directly or—as shown in FIG. 1—indirectly via a tethering ring 5b'.

The fixed bearing securing elements 5 are rigid elements made of fibre-reinforced materials, preferably comprising aramide fibres, carbon fibres, glass fibres, basalt fibres or combinations thereof, particularly preferably comprising aramide fibres which, in sections, are mixed with glass fibres. The fixed bearing securing elements 5 are secured to the outer container 1 and the inner container 2 by screws, rivets, bolts, which have the advantage of being rotatable, gluing, clamping, hooking etc.

Since only a single fixed bearing 30 is provided, the inner container 2 is suspended in the outer container 1 in a freely cantilevered manner. Since the fixed bearing securing elements 5 engage the outer circumference of the inner container 2 and the inner circumference of the outer container 1, very high forces can be supported. Thus, in comparison to the prior art larger inner containers 2 without floating bearings can be designed. The free space between the inner container 2 and the outer container 1 is evacuated. Since the line 6 is guided through said vacuum, the thermal insulation capacity of the container arrangement 20 is additionally improved.

The fixed bearing securing elements 5 are oblique to the longitudinal axis L2 of the inner container 2 and are mirrored, always in pairs, at a plane including the longitudinal axis L2 of the inner container. The contact points 5a of the fixed bearing securing elements 5 at the inner container 2 are axially closer to the centre Z of the inner container 2 than the contact points 5b of the fixed bearing securing elements 5 at the outer container 1.

Figure 2:
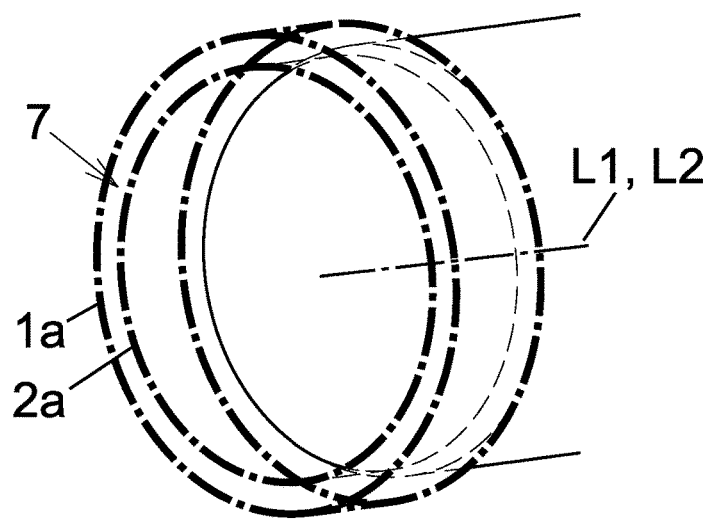
FIG. 2 shows a geometric annular installation space in which the securing elements of the suspension system according to the invention are arranged.

In geometric terms, the fixed bearing securing elements 5 are arranged in an annular installation space 7 defined between the outer wall 2a of the inner container 2 and the inner wall 1a of the outer container 1, as illustrated in particular in FIG. 2.

Figure 3:
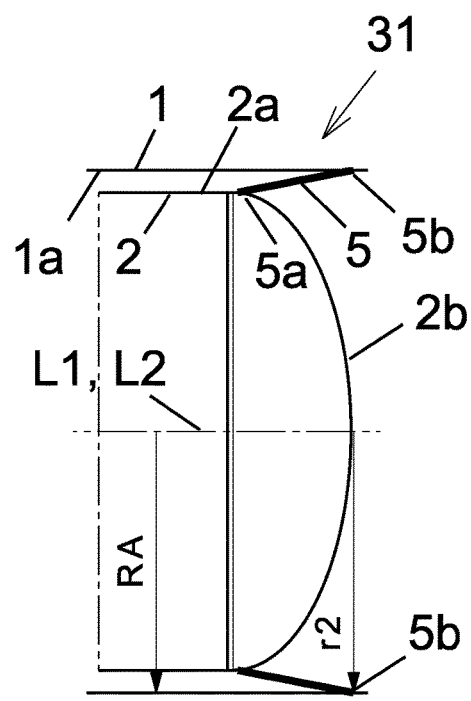
FIGS. 3 to 5 show variants for positioning the fixed bearing securing elements within the annular installation space.
Figure 4:
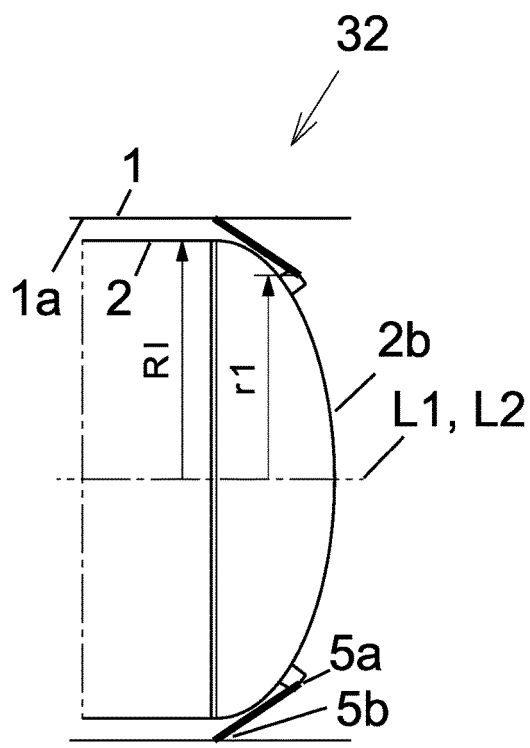
Figure 5:
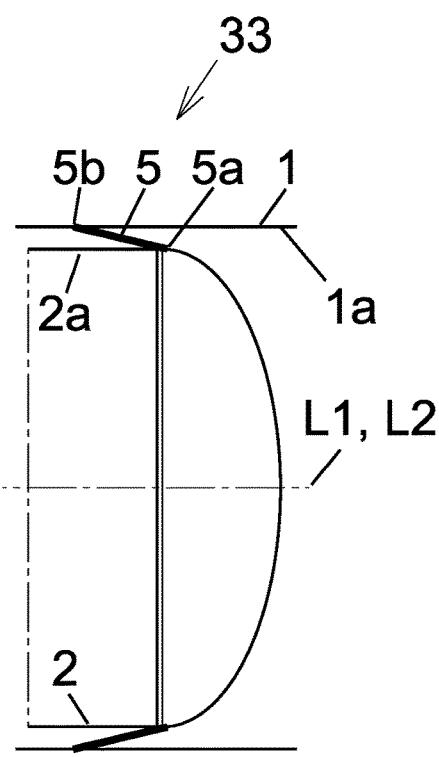

FIGS. 3 to 5 show parts of geometric variation possibilities for positioning the fixed bearing securing elements 5 within the annular installation space of the fixed bearing.

FIG. 3 shows a fixed bearing 31 wherein the contact points 5a of the fixed bearing securing elements 5 at the inner container 2 are located on a peripheral circle which is defined in the area of the transition from the peripheral wall 2a to the front wall 2b. The contact points 5b of the fixed bearing securing elements 5 are located on a peripheral circle at the inner wall 1a of the outer container 1 and are axially further away from the centre of the inner container than the contact points 5a at the inner container 2. Generally speaking, the contact points 5b are radially (arrow r2) closer to the circumference (arrow RA) of the outer container 1 than to the longitudinal axis L1 thereof, wherein, in the illustrated special case, the length of the arrows RA and r2 is the same, since the contact points 5b are located directly at the circumference of the inner wall 1a of the outer container 1.

FIG. 4 shows a fixed bearing 32 in which the contact points 5a of the fixed bearing securing elements 5 at the inner container 2 are located on a circle defined at the front wall 2b. It should be noted that the contact points 5a are radially (arrow r1) closer to the circumference (arrow RI) of the inner container 2 than to the longitudinal axis L2 of the inner container. The contact points 5b of the fixed bearing securing elements 5 are located on a peripheral circle at the inner wall 1a of the outer container 1 and are positioned axially closer to the centre of the inner container 2 than the contact points 5a at the inner container 2.

FIG. 5 shows a fixed bearing 33 similar to FIG. 4, wherein the contact points 5b of the fixed bearing securing elements 5 are likewise located on a peripheral circle at the inner wall 1a of the outer container 1. Furthermore, the contact points 5b at the outer container 1 are positioned axially closer to the centre of the inner container 2 than the contact points 5a at the inner container 2. In contrast to FIG. 4, in said embodiment of the fixed bearing 33 according to FIG. 5, the circular line on which the contact points 5a are located at the inner container 2 are defined at the outer peripheral wall 2a.

FIG. 6 shows a container arrangement 21 comprising the outer container 1 with a longitudinal axis L1 and the inner container 2 with a longitudinal axis L2, which is mounted for thermal insulation in the outer container 1. The two containers 1, 2 are arranged coaxially to each other and interconnected by a suspension system comprising the above-described fixed bearing 31 and, in addition, a floating bearing 41. The floating bearing 41 has a floating bearing ring 10 which is made of a rigid material such as a fibre-reinforced synthetic material or metal or, respectively, metal alloys and is mounted so as to be axially displaceable (see double arrow) along the inner wall 1a of the outer container 1. Rod-shaped floating bearing securing elements 11, which can be stressed in tension and in compression, engage, on the one hand, the floating bearing ring 10 and, on the other hand, the inner container 2, while being distributed annularly. The floating bearing ring 10 is prestressed by means of tension springs 12 engaging the outer container 1 directly or indirectly. From a geometric point of view (analogously to the illustration of FIG. 2), the floating bearing securing elements 11 are arranged in an annular installation space extending essentially around the circumference of the inner container 2. The floating bearing securing elements 11 are manufactured from a material as rigid as possible. Very suitable are fibre-reinforced materials, preferably comprising aramide fibres, carbon fibres, glass fibres, basalt fibres or combinations thereof, particularly preferably comprising aramide fibres which, in sections, are mixed with glass fibres.

The floating bearing securing elements 11 are oblique to the longitudinal axis L2 of the inner container 2 and are mirrored, always in pairs, at a plane including the longitudinal axis L2 of the inner container. The contact points 11a of the floating bearing securing elements 11 at the inner container 2 are closer to the centre Z of the inner container 2 than the contact points 11b of the securing elements 11 at the floating bearing ring 10.

FIG. 7 shows a variant of a container arrangement 22 comprising the outer container 1 and the inner container 2 mounted for thermal insulation in the outer container 1. In said variant, the suspension system, which interconnects the two containers 1, 2, comprises the fixed bearing 32 as described above on the basis of FIG. 4 and, in addition, a variant of a floating bearing 42 in which—unlike in FIG. 6—the floating bearing ring 10 is arranged above the inner container 2 and is pre-biased by compression springs 13 engaging the outer container 1 directly or indirectly. The floating bearing securing elements 11 engage, on the one hand, the floating bearing ring 10 and, on the other hand, the front wall 2b of the inner container 2 in proximity to the circumference, while being distributed annularly. The floating bearing securing elements 11 are oblique to the longitudinal axis L2 of the inner container 2. The contact points 11a of the floating bearing securing elements 11 at the inner container 2 are, from an axial point of view, further away from the centre Z of the inner container 2 than the contact points 11b of the securing elements 11 at the floating bearing ring 10.

Figures 8A, 8B:
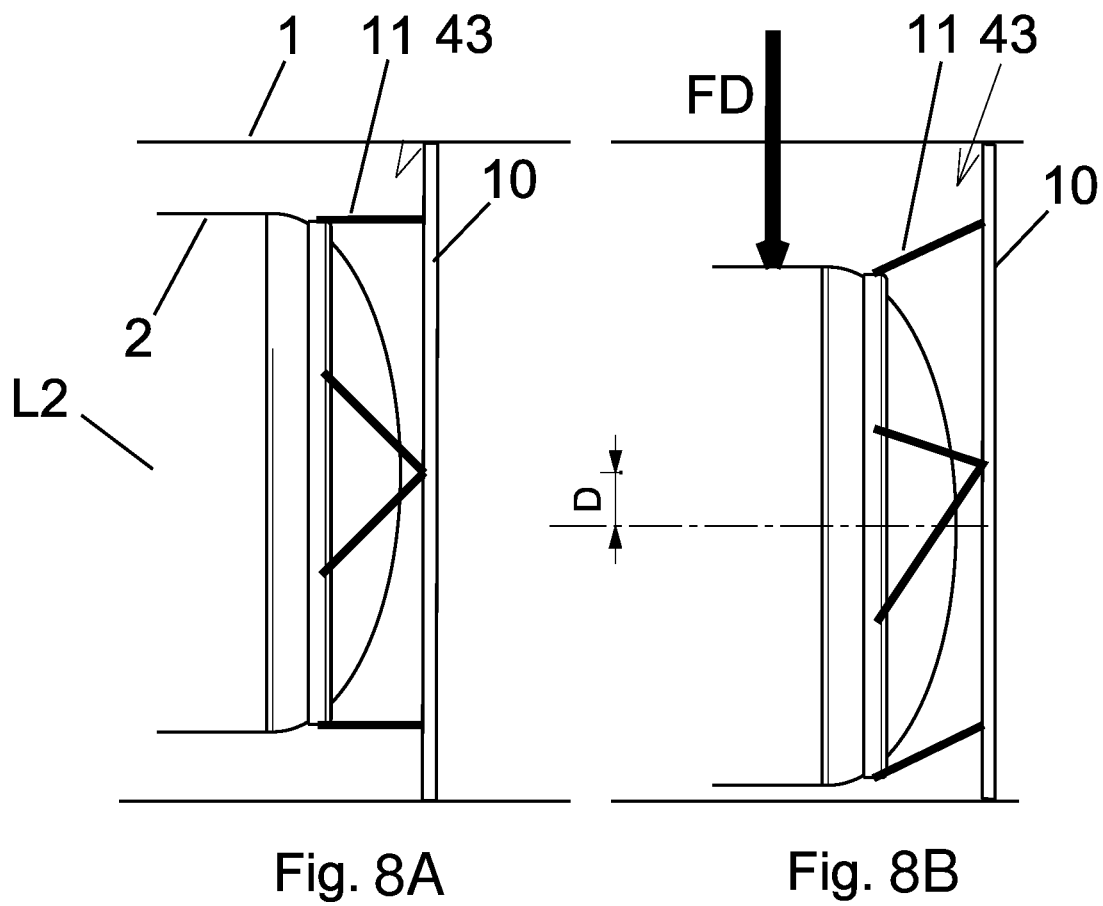
FIG. 8A and FIG. 8B show a particularly advantageous embodiment of a floating bearing of the suspension system according to the invention.

In FIG. 8A and FIG. 8B, a particularly advantageous embodiment of a floating bearing 43 is illustrated, wherein the floating bearing securing elements 11 are connected to the inner container 2 and the floating bearing ring 10 in a geometric installation space which is roughly cylindrical. Said embodiment provides the major advantage that, in case of a dynamic load FD which is transverse to the longitudinal axis L2, the inner container 2 will indeed be deflected in the direction of the dynamic load (reference symbol D), but, due to the roughly cylindrical installation space, the deflection D will lead to practically no inclination of the floating bearing ring 10, as can be seen in FIG. 8B.

Figure 9A:
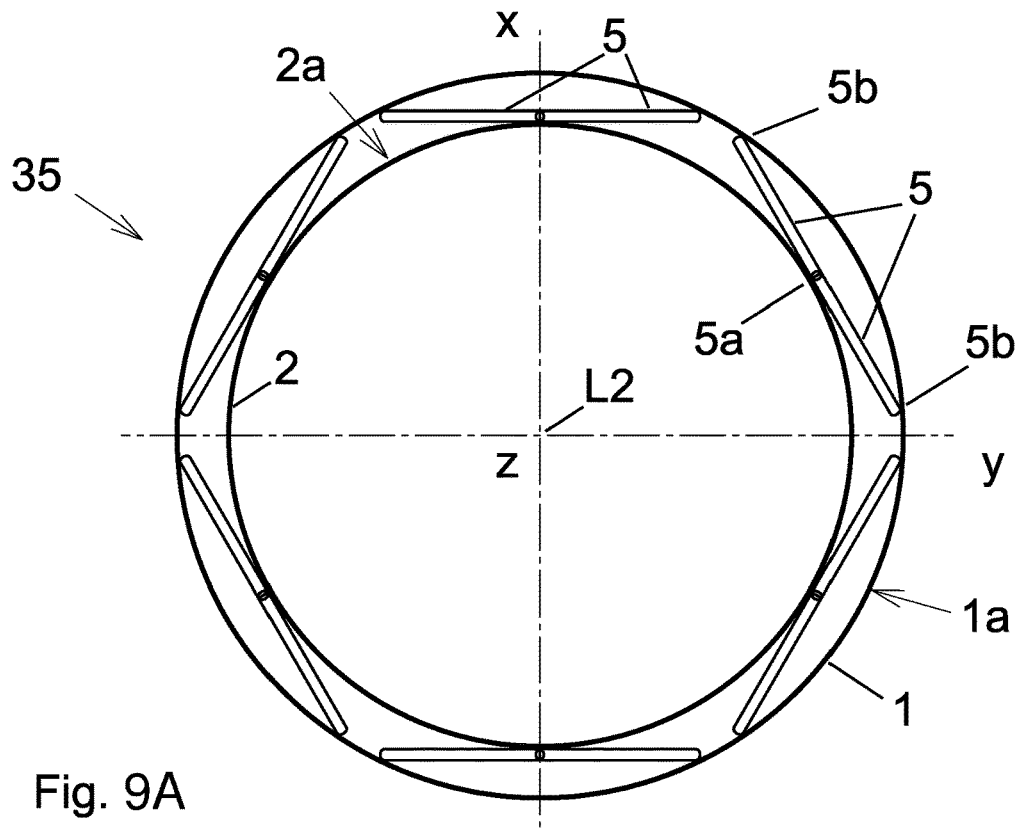
FIG. 9A and FIG. 9B show a fixed bearing of the suspension system according to the invention in a front view and in an isometric view.
Figure 9B:
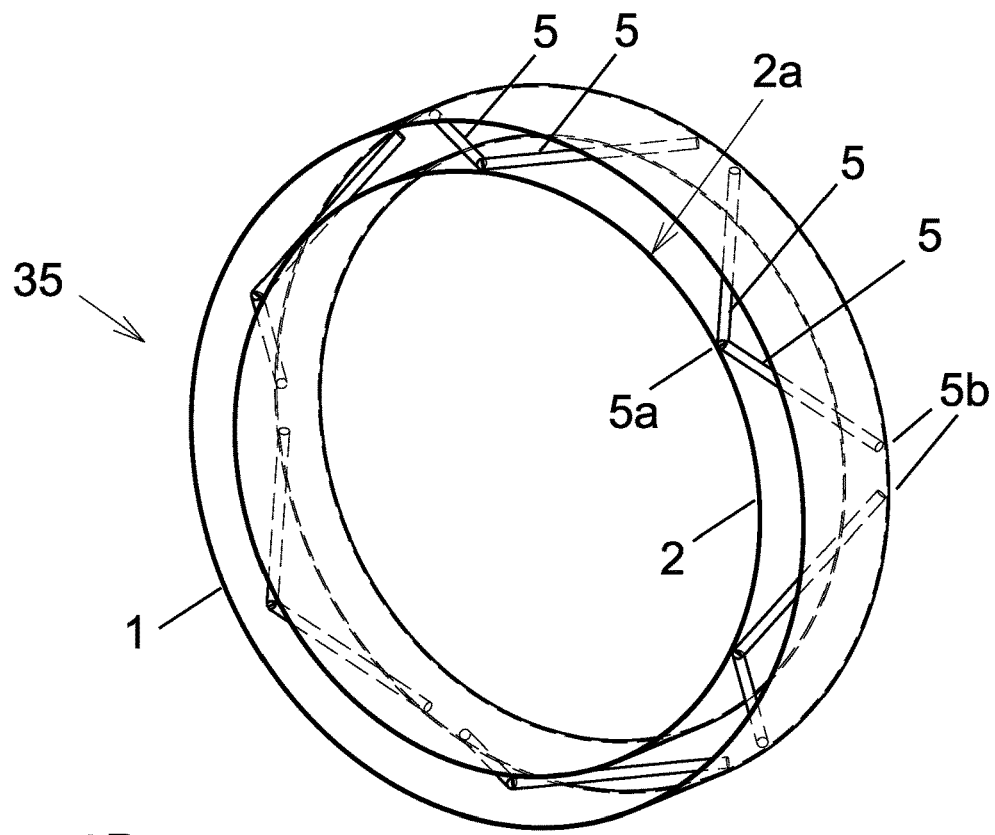

In FIGS. 9A and 9B, a fixed bearing 35 equivalent to FIG. 1 is illustrated in a front view and in an isometric view. The contact points 5b of the fixed bearing securing elements 5 are located on a peripheral circle at the inner wall 1a of the outer container 1, while being distributed annularly. The contact points 5a of the fixed bearing securing elements 5 are located at the inner container 2 on a circle defined at the outer wall 2a. The fixed bearing securing elements 5 are oblique to the longitudinal axis L2 of the inner container 2, the longitudinal axis L2 including the centre Z, and are mirrored, always in pairs, at a plane including the longitudinal axis L2 of the inner container, see, e.g., plane x.

Figure 10A:
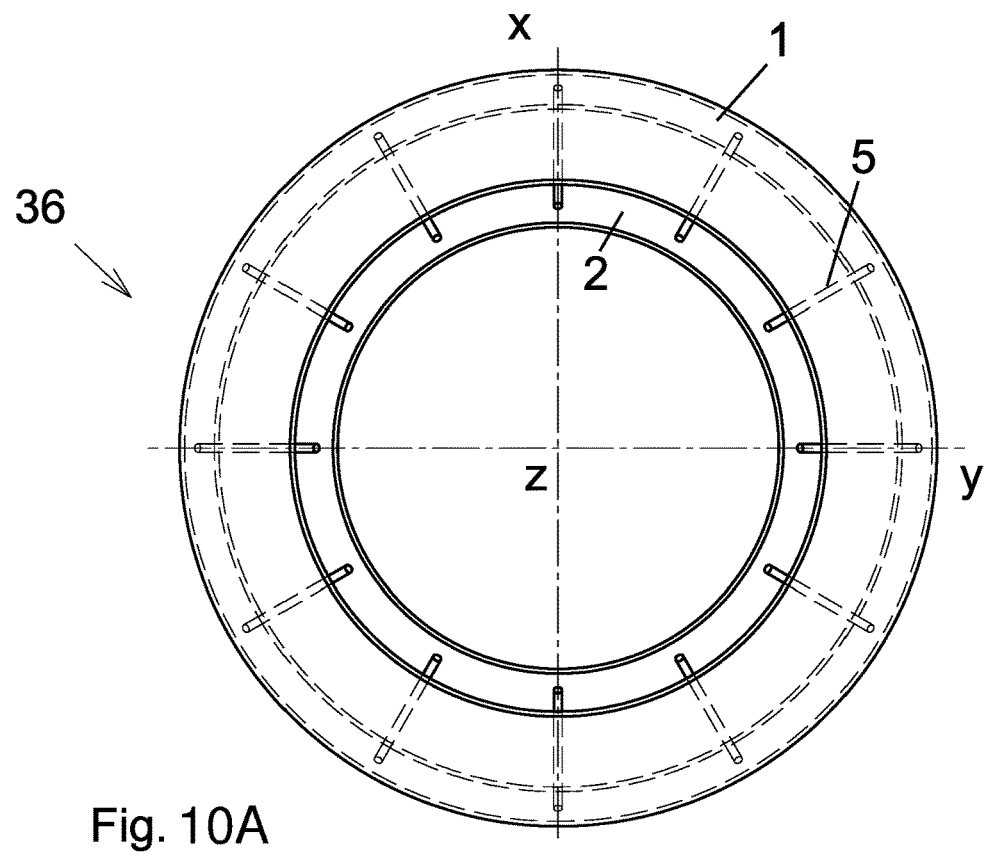
FIG. 10A and FIG. 10B show a further embodiment of a fixed bearing of the suspension system according to the invention in a front view and in an isometric view.
Figure 10B:
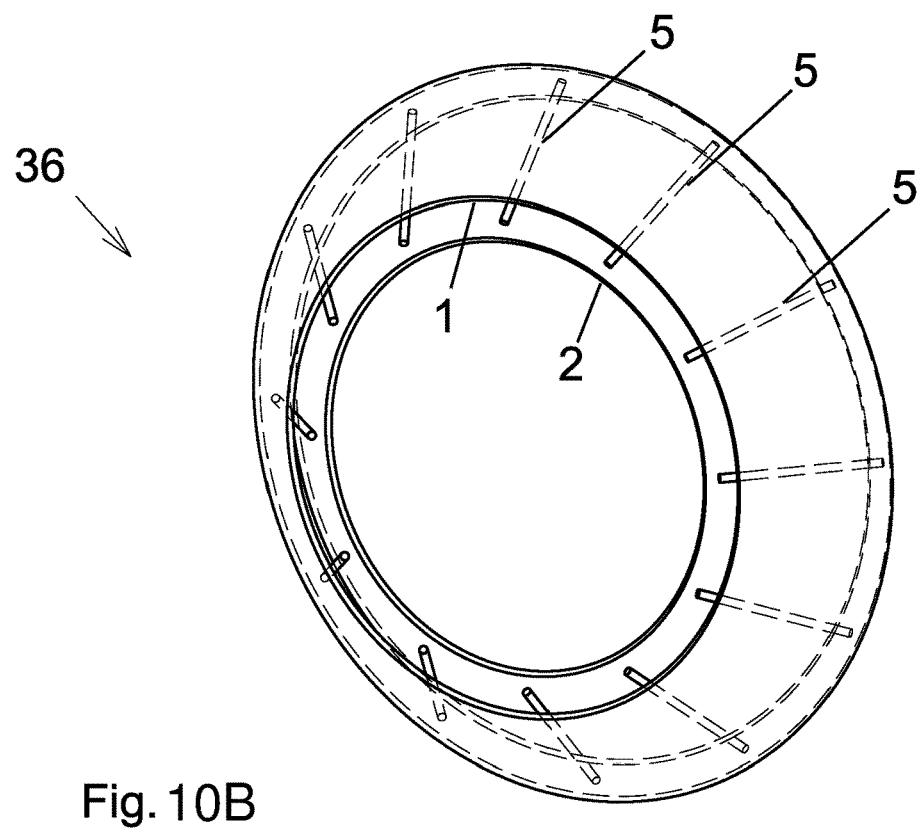

In FIGS. 10A and 10B, a fixed bearing 36 is illustrated in a front view and in an isometric view. In this case, the fixed bearing securing elements 5 are arranged radially between the outer container 1 and the inner container 2 and are distributed evenly across the circumference. The fixed bearing securing elements 5 form a cone with a cone angle of, e.g., 45° and are themselves, of course, located in a solid angle of 45° with respect to the longitudinal axis L2 of the inner container 2 and with respect to the coaxial longitudinal axis L1 of the outer container 1. The radial arrangement displays less rigidity against torsion of the outer container 1 relative to the inner container 2 than the previously described implementations of fixed bearings.

Figure 11:
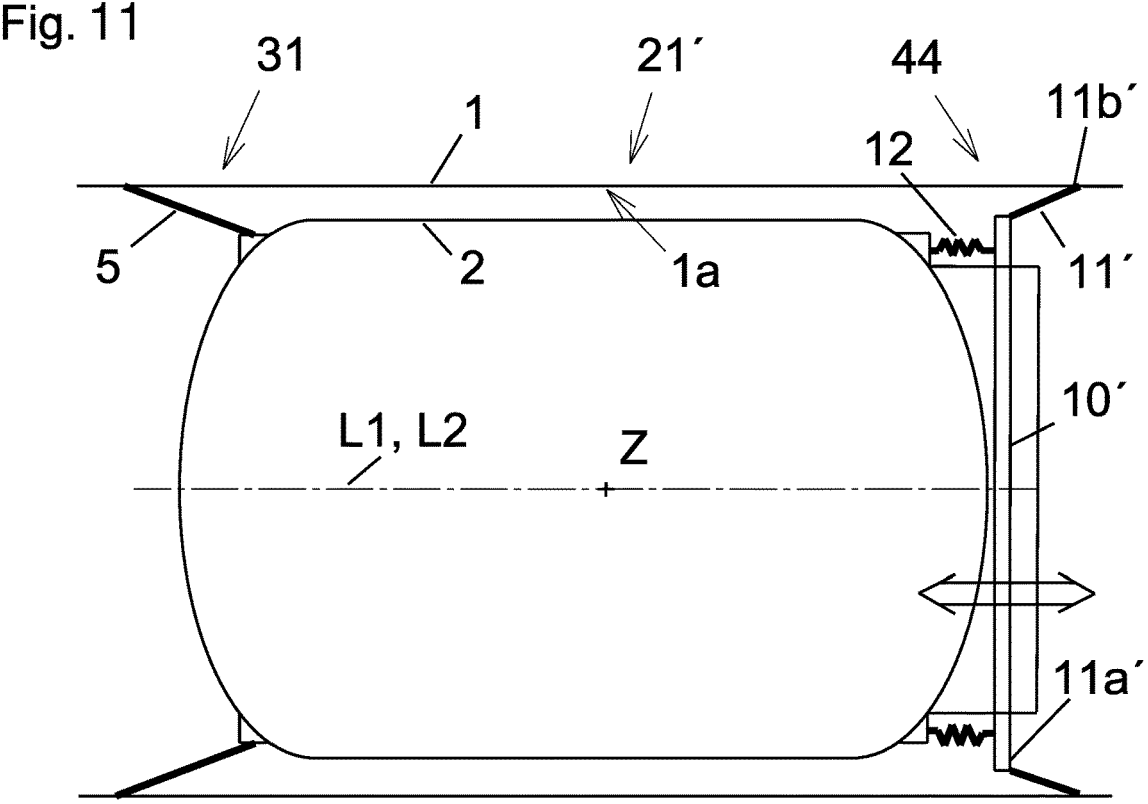
FIG. 11 shows a schematic longitudinal view of an alternative embodiment of a container arrangement according to the invention.

FIG. 11 shows a container arrangement 21' similar to FIG. 6 comprising the outer container 1 with a longitudinal axis L1 and the inner container 2 with a longitudinal axis L2, which is mounted for thermal insulation in the outer container 1. The two containers 1, 2 are arranged coaxially to each other and are interconnected by a suspension system comprising the above-described fixed bearing 31 and, in addition, a floating bearing 44. The floating bearing 44 has a floating bearing ring 10' made of a rigid material such as a fibre-reinforced synthetic material or metal or, respectively, a metal alloy. Floating bearing securing elements 11', which can be stressed in tension and in compression, engage, on the one hand, the floating bearing ring 10' with contact points 11a' and, on the other hand, the outer container 1 via contact points 11b', while being distributed annularly, and thus keep the floating bearing ring 10' in a defined position. The inner container 2 is arranged displaceably in the floating bearing ring 10' (symbolized by a double arrow), wherein, in said embodiment, a cylindrical appendage of the inner container 2 is mounted displaceably in the floating bearing ring 10'. The inner container 2 is prestressed by tension springs 12 engaging the inner container 2 and the floating bearing ring 10'. The floating bearing securing elements 11' are manufactured from a material as rigid as possible. Very suitable are fibre-reinforced materials, preferably comprising aramide fibres, carbon fibres, glass fibres, basalt fibres or combinations thereof, particularly preferably comprising aramide fibres which, in sections, are mixed with glass fibres. The contact points 11b' of the floating bearing securing elements 11' at the outer container 1 are axially further away from the centre Z of the inner container 2 than the contact points 11a' of the floating bearing securing elements 11' at the floating bearing ring 10'.

Figure 12:
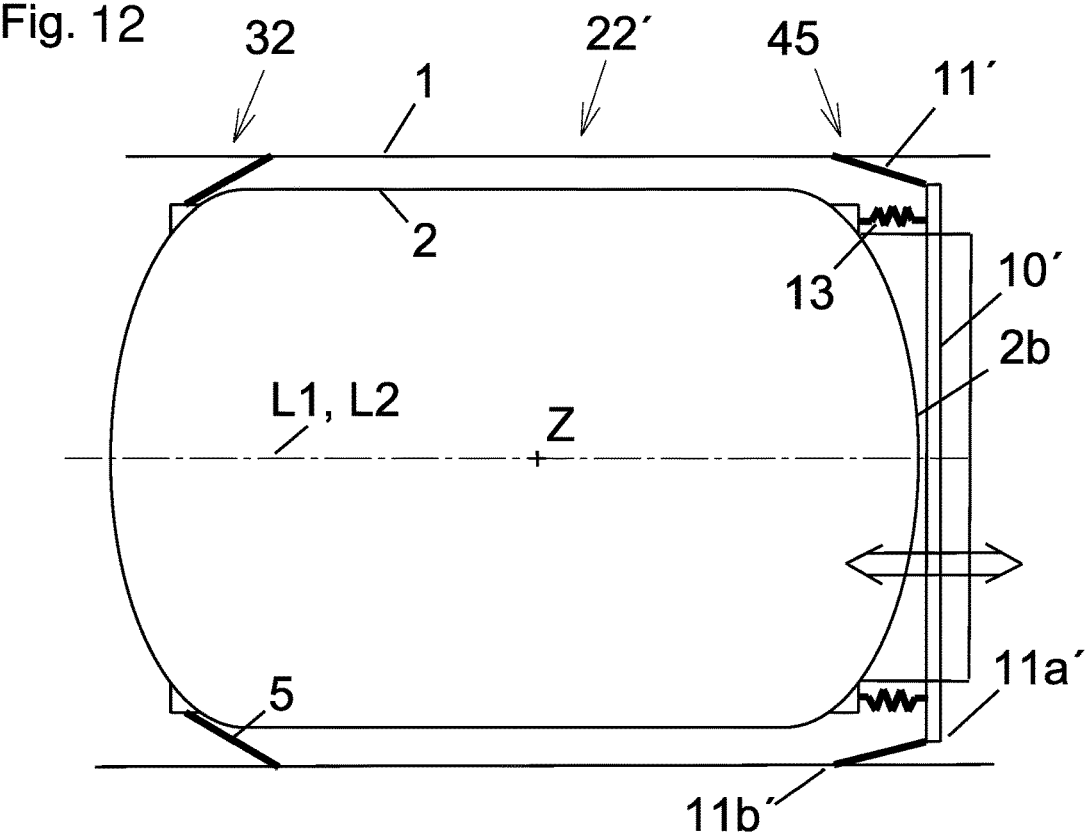
FIG. 12 shows a schematic longitudinal view of a further embodiment of a container arrangement according to the invention.

FIG. 12 shows a further embodiment of a container arrangement 22' according to the invention which is similar to the embodiment of FIG. 11, but differs therefrom in a design of the fixed bearing 32 as described above on the basis of FIG. 7 and in a variant of the floating bearing 45. The floating bearing 45 has a floating bearing ring 10' made of a rigid material such as a fibre-reinforced synthetic material or metal or, respectively, a metal alloy. Floating bearing securing elements 11', which can be stressed in tension and in compression, engage, on the one hand, the floating bearing ring 10' with contact points 11a' and, on the other hand, the outer container 1 via contact points 11b', while being distributed annularly, and thus keep the floating bearing ring 10' in a defined position. The inner container 2 is arranged displaceably in the floating bearing ring 10' with an appendage (symbolized by a double arrow). The inner container 2 is prestressed by compression springs 13 engaging the inner container 2 and the floating bearing ring 10'. The contact points 11a' of the floating bearing securing elements 11' at the floating bearing ring 10' are axially further away from the centre Z of the inner container 2 than the contact points 11b' of the floating bearing securing elements 11' at the outer container 1.

Fibre-reinforced parts can normally be stressed in tension more than in compression. The tension springs 12 and the compression springs 13 serve for factoring in those different load capacities in tension and in compression.

The invention claimed is:

1. A container suspension system for suspending an inner container within an outer container, comprising:
    an outer container;
    an inner container mounted for thermal insulation in the outer container, the inner container having a first end, a second end opposite the first end, and a length extending between the first end and the second end;
    an annular installation space defined between the inner container and the outer container; and
    a plurality of rod-shaped fixed bearing securing elements, each engaging the outer container at an outer container contact point and the inner container at an inner container contact point, and which are capable of being stressed in tension and in compression, the fixed bearing securing elements being arranged so as to be distributed in the annular installation space,
    wherein the inner container contact points are located radially closer to an outer circumference of the inner container than to a longitudinal axis of the inner container and the outer container contact points are located radially closer to an outer circumference of the outer container than to a longitudinal axis of the outer container,
    wherein the fixed bearing securing elements are oblique to the longitudinal axis of the inner container and are neither parallel nor normal to the longitudinal axis of the inner container.

2. The container suspension system of claim 1, wherein the fixed bearing securing elements are not aligned along any axes that intersect the longitudinal axis of the inner container.

3. The container suspension system of claim 1, wherein the inner container contact points are located on a normal plane relative to the longitudinal axis of the inner container.

4. The container suspension system of claim 1, wherein the outer container contact points are located on a normal plane relative to the longitudinal axis of the outer container.

5. The container suspension system of claim 1, wherein the inner container contact points are axially closer to a center of the inner container than the outer container contact points.

6. The container suspension system of claim 1, wherein the outer container and the inner container are arranged with coaxial longitudinal container axes.

7. The container suspension system of claim 1, wherein the fixed bearing securing elements are attached to the inner container along the outer circumference of the inner container and are attached to the outer container along an inner circumference of the outer container.

8. The container suspension system of claim 1, wherein the fixed bearing securing elements are formed from fibre-reinforced materials.

9. The container suspension system of claim 8, wherein the fibre-reinforced materials are selected from aramide fibres, carbon fibres, glass fibres, basalt fibres or combinations thereof, and optionally comprising aramide fibres which, in sections, are mixed with glass fibres.

* * * * *